United States Patent
Salo et al.

(10) Patent No.: US 6,320,715 B1
(45) Date of Patent: Nov. 20, 2001

(54) DRIVE ELECTRONICS EMPLOYING UNIPOLAR LAST WRITE FOR IMPROVED MAGNETIC STABILITY

(75) Inventors: Michael Paul Salo, San Jose; Albert John Wallash, Morgan Hill, both of CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/705,103

(22) Filed: Nov. 2, 2000

Related U.S. Application Data

(62) Division of application No. 09/178,332, filed on Oct. 23, 1998, now Pat. No. 6,169,639.

(51) Int. Cl.[7] ................................................ G11B 5/02
(52) U.S. Cl. ................................................ 360/68
(58) Field of Search ........................... 360/68, 46, 39, 360/40, 67

(56) References Cited

U.S. PATENT DOCUMENTS

| | | | |
|---|---|---|---|
| 4,651,235 | * 3/1987 | Morita et al. | 360/46 |
| 5,576,908 | * 11/1996 | Garfunkel et al. | 360/46 |
| 5,910,861 | * 6/1999 | Ahn | 360/46 |
| 6,169,639 | * 1/2001 | Salo et al. | 360/46 |

* cited by examiner

Primary Examiner—Alan T. Faber
(74) Attorney, Agent, or Firm—Ervin F. Johnston

(57) ABSTRACT

A method, devices, and an article of manufacture for reducing magnetic instability in a magnetoresistive read head of a combined read-write head after writing data onto a magnetic storage medium. The last write pulse polarity that results in the least amount of magnetic instability in the read head is determined, and is referred to as the designated polarity. Then, after a set of write pulses is written, it is determined whether the last write pulse has the designated polarity. If the last write pulse does not have the designated polarity, then an additional write pulse with the designated polarity is written. Thus, the last write pulse before a read always has the designated polarity, thereby reducing the magnetic instability of the read head, and consequently improving read head performance.

9 Claims, 8 Drawing Sheets

DRIVE ELECTRONICS EMPLOYING UNIPOLAR LAST WRITE FOR IMPROVED MAGNETIC STABILITY

REFERENCE TO RELATED APPLICATION

This is a divisional of application Ser. No. 09/178,332 filed Oct. 23, 1998, now U.S. Pat. No. 6,169,639.

BACKGROUND OF THE INVENTION

1. Field of the Invention

The present invention relates to improving the read performance of a combined read-write head used for data storage on magnetic media. More particularly, the invention concerns reducing magnetic instability in the read head of a combined readwrite head after writing, to improve read performance.

2. Description of the Related Art

Combined read and write heads, which are typically merged heads or piggyback heads, are commonly used for storing and retrieving data on magnetic media such as magnetic disks and tape. Combined read-write heads include both a read head and a write head. In a merged head, the read head and write head share a second shield that is also the first pole of the write head. In contrast, in a piggyback head, the second shield and the first write pole are separate parts separated by a magnetic insulating layer. The read head portion of a combined read-write head frequently employs a magnetoresistive (MR) sensor to read data. The resistance of a magnetoresistive sensor changes when the sensor is exposed to a magnetic field. A positive polarity magnetic field results in a different resistance than a negative polarity magnetic field. To read data, a current is passed through the MR sensor and the sensor is exposed to magnetic fields on a magnetic medium. The resulting voltages across the sensor, which are representative of the data on the magnetic medium, are then detected. Alternatively, a voltage can be applied to the sensor, and resulting changes in current through the sensor which are representative of the data on the magnetic medium are detected.

MR sensors are commonly designed with the magnetization of the head oriented at the optimal angle, also referred to as the optimal bias point, in relation to the direction of the current through the sensor. Exposure of the MR sensor to the relatively large magnetic fields of the pulses from the write head in a combined read-write head can disturb the domain state in the MR sensor, causing the response of the MR sensor, and thus the response of the head, to become nonlinear and/or inconsistent, and can also result in Barkhausen noise. Repeatability of the response of the MR sensor when the MR sensor is successively exposed to magnetic fields, and linearity of the response of the MR sensor when the MR sensor is exposed to a magnetic field, are key to proper operation of the read head. Thus, the nonlinearity and nonrepeatability induced by the write pulses is highly undesirable.

This magnetic instability-in the MR sensor, which can be caused by the write pulses, can degrade the read performance of the head, resulting in errors when reading data. One commonly used measure of instability of read heads is the covariance of the head (which can also be referred to as the "bias Aljohn number"). The covariance is a measure of the instability of the voltage amplitude of the read head after writing with the write head, and is given by dividing the standard deviation of the amplitude of the voltage across the MR sensor, by the mean amplitude of the voltage across the MR sensor. Other measures of magnetic instability include the data error rate, the servo error rate, and track misregistration. The data error rate is determined by writing data to the disk and then reading the data and measuring the number of errors. The servo error rate is the number of servo errors in a time period. Position error signals are monitored to determine the amount of track misregistration. For example, the standard deviation of the position error signals can be used as a measure of magnetic instability of the head.

FIG. 1A is a graph relating to the covariance of the voltage amplitude across the MR sensor of a first merged head. FIG. 1A depicts the amplitude of the voltage across the MR sensor at a variety of track positions. The head was tested on a spin-stand, with the polarity of the last write pulse before each read being random. 250 samples were taken at each track position, and the covariance of the voltage amplitude was calculated at each track position. The covariance values, which are indicative of the voltage amplitude instability of the MR sensor at each track position, are printed above the horizontal axis. For example, for this first head, the covariance at track position 1500 (on-track) is 2.3.

FIG. 2A is a similar graph depicting the amplitude of the voltage across the MR sensor of a second merged head. As with the first head, 250 samples were taken at a variety of track positions, with the polarity of the last write pulse before each read being random. Covariance values are printed above the horizontal axis. For this second head, the covariance at track position 1500 is 1.7.

Magnetic storage devices, such as disk drives, commonly employ a number of combined read-write heads, for example, 20 combined read-write heads. Magnetic instability in any of the heads is undesirable. Magnetic instability of heads adversely affects production yields of disk drives, degrades the performance of heads that pass initial testing, causes servo instability in sector servo files, and calls into question longterm magnetic stability during the life of the product. Accordingly, any improvement in the magnetic stability of heads is highly desirable.

SUMMARY OF THE INVENTION

Broadly, the present invention concerns a method, devices, and an article of manufacture for reducing magnetic instability in a read head of a combined read-write head, after writing data onto a magnetic storage medium.

The invention is based upon the discovery that, in a combined read-write head having a magnetoresistive (MR) read head, magnetic instability in the MR read head can be reduced or substantially eliminated if the last write pulse before each read always has the same designated polarity. The combined head can be any type of combined readwrite head, and will typically be a merged head or a piggyback head. The designated polarity is either always positive or always negative, with one of the polarities usually producing better results than the other for a particular head. This is in contrast to the previous practice wherein the polarity of the last write pulse before a read is dependent upon the data written, and is therefore random. The polarity of last write pulses that results in the smallest amount of magnetic instability is determined empirically. One or more of a variety of methods for determining the amount of magnetic instability can be used. For example, the covariance of the voltage amplitude, the data error rate, the servo error rate, and/or the amount of track misregistration can all be used to determine the amount of magnetic instability after both positive polarity and negative polarity last write pulses.

To practice an illustrative embodiment of the invention, the last write pulse polarity that results in the least amount of magnetic instability for the head is determined, and is then referred to as the designated polarity. Next, after a set of write pulses is written, it is determined whether the last write pulse has the designated polarity. If the last write pulse does not have the designated polarity, then an additional write pulse with the designated polarity is written. Thus, the last write pulse before a read always has the designated polarity.

The invention affords its users with the distinct advantage of improving the magnetic stability of the MR head, which improves the linearity of the response when the MR head is exposed to a magnetic field, and improves the repeatability of the response of the MR head when the MR head is successively exposed to magnetic fields. Accordingly, the performance of the read head is improved. The present invention also provides other advantages and benefits, which are apparent from the following description.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

The present invention concerns a method, devices, and an article of manufacture for reducing magnetic instability in a read head of a combined read-write head after writing data onto a magnetic storage medium.

The invention is based upon the discovery that, in a combined read-write head having a magnetoresistive (MR) read head (which is a read head employing a magnetoresistive sensor), magnetic instability in the MR read head can be reduced or substantially eliminated if the last write pulse before each read always has the same designated polarity. The designated polarity is either always positive or always negative, with one of the polarities usually producing better results than the other for a particular head. All positive polarity pulses or all negative polarity pulses can be referred to as unipolar last write pulses. This is in contrast to the previous practice wherein the polarity of the last write pulse before a read is dependent upon the data written, and is therefore random. The polarity of last write pulses that results in the smallest amount of magnetic instability is determined empirically. One or more of a variety of methods for measuring the amount of magnetic instability can be used. For example, the covariance of the voltage amplitude of the read head, the data error rate, the servo error rate, and/or the amount of track misregistration can all be used to determine the amount of magnetic instability in the read head after both positive polarity and negative polarity last write pulses.

When the final write pulse is of the desired polarity, the domain state of the MR sensor is, to a substantial extent, restored to the optimal magnetic domain state that the MR sensor was in prior to being subjected to magnetic pulses from the write head. The biasing layer of the MR sensor is also, to a substantial extent, restored to its optimal magnetic domain state. This improves the linearity of the response of the MR read head when the MR read head is exposed to a magnetic field, and improves the repeatability of the response of the MR read head when the MR read head is successively exposed to magnetic fields. Consequently, the magnetic instability of the read head is reduced, and the performance of the read head is improved. The reduced magnetic instability can be indicated by reduced voltage amplitude covariance, a better data error rate, a better servo error rate, and/or reduced track misregistration.

Figure 1A:
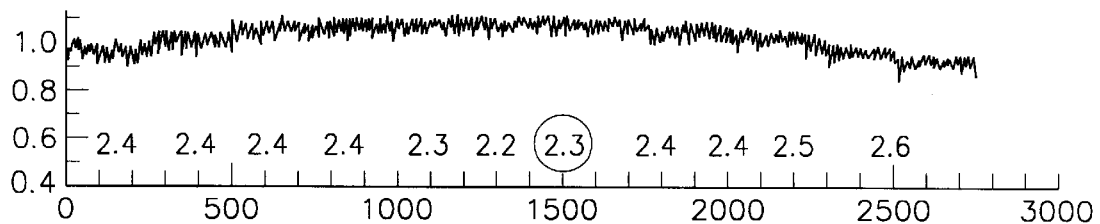
FIG. 1A is a graph depicting the amplitude of the voltage across the magnetoresistive (MR) read head in a first representative merged head at a variety of track positions, with the polarity of the last write pulse before each read being random.
Figure 1B:
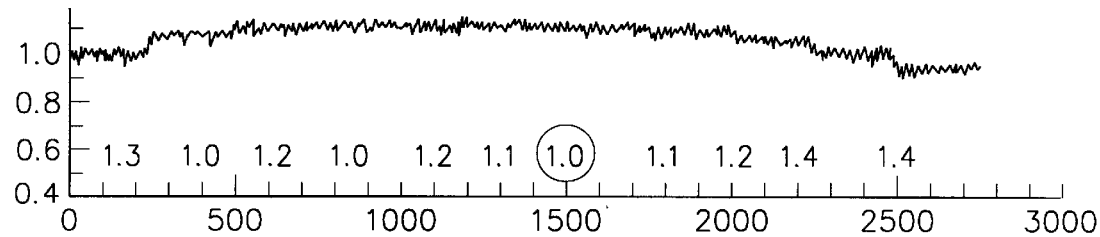
FIG. 1B is a graph depicting the amplitude of the voltage across the magnetoresistive (MR) read head in the same merged head used for FIG. 1A, at a variety of track positions, with the polarity of the last write pulse before each read being positive.

FIG. 1B is a graph depicting the amplitude of the voltage across the MR sensor, which can also be referred to as the voltage across the MR read head, of a first merged head at a variety of track positions. The head was tested on a spin-stand, with the polarity of the last write pulse before each read being positive, which may also be referred to as positive disturb. 250 samples were taken at each track position. The covariance of the voltage amplitude was calculated at each track position, and is printed above the horizontal axis. For example, for this first head, with positive polarity last write pulses, the covariance at track position 1500 (on-track) is 1.0.

Figure 1C:
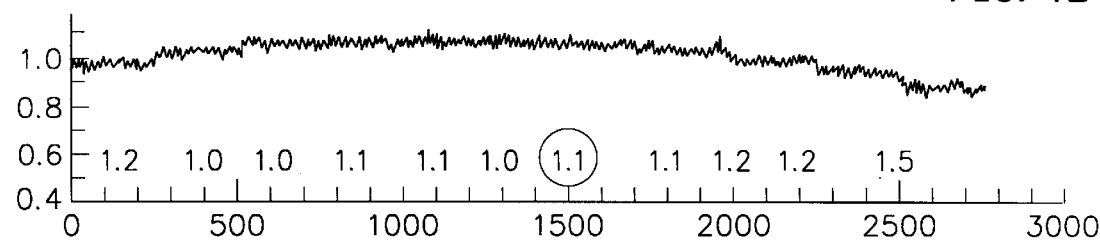
FIG. 1C is a graph depicting the amplitude of the voltage across the magnetoresistive (MR) read head in the same merged head used for FIG. 1A, at a variety of track positions, with the polarity of the last write pulse before each read being negative.

FIG. 1C is a similar graph depicting the amplitude of the voltage across the MR sensor of the same first merged head at a variety of track positions, but with the polarity of the last write pulse before each read being negative, which may also be referred to as negative disturb. For this first head, with negative polarity last write pulses, the covariance at track position 1500 is 1.1.

FIG. 1A, which is a similar graph for the first merged head, but with the polarity of the last write pulses being random, which may also be referred to as random disturb, is discussed in the background section.

Comparing the covariance values at track position 1500 for the first head, it is evident that the covariance value of 1.0 for positive polarity last write pulses (FIG. 1B), and the covariance value of 1.1 for negative polarity last write pulses (FIG. 1C), are both far less than the covariance value of 2.3 for random polarity last write pulses (FIG. 1A). There is a 56% decrease in the covariance when the last write pulse polarity is either always positive or always negative. There is similar improvement at track positions other than 1500. Thus, for this first head, there is a significant decrease in the covariance with either all positive polarity or all negative polarity last write pulses, with the covariance for all positive polarity last write pulses being slightly less than for all negative polarity last write pulses.

Figure 2A:
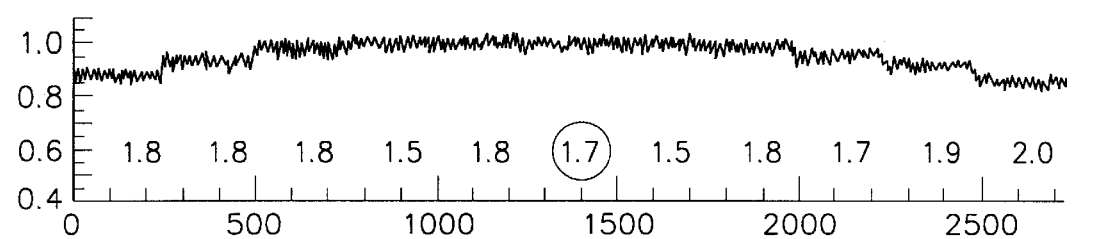
FIG. 2A is a graph depicting the amplitude of the voltage across a magnetoresistive (MR) read head in a second representative merged head at a variety of track positions, with the polarity of the last write pulse before each read being random.
Figure 2B:
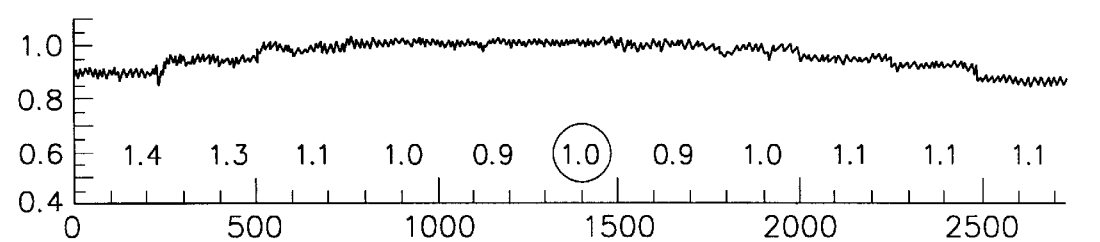
FIG. 2B is a graph depicting the amplitude of the voltage across the magnetoresistive (MR) read head in the same merged head used for FIG. 2A, at a variety of track positions, with the polarity of the last write pulse before each read being positive.

FIG. 2B is a similar graph depicting the amplitude of the voltage across the MR sensor of a second merged head. For this second head with positive polarity last write pulses, the covariance at track position 1500 is 1.0.

Figure 2C:
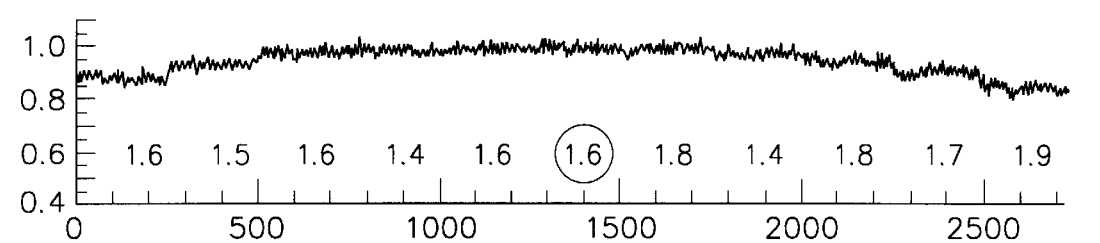
FIG. 2C is a graph depicting the amplitude of the voltage across the magnetoresistive (MR) read head in the same merged head used for FIG. 2A, at a variety of track positions, with the polarity of the last write pulse before each read being negative.

FIG. 2C is a similar graph depicting the amplitude of the voltage across the MR sensor of the same second merged head at a variety of track positions, but with the polarity of the last write pulse before each read being negative. For this second head with negative polarity last write pulses, the covariance at track position 1500 is 1.6.

FIG. 2A, which is a similar graph for the second merged head, but with the polarity of the last write pulses being random, is discussed in the background section.

Comparing the covariance values at track position 1500 for the second head, it is evident that the covariance value of 1.0 for positive polarity last write pulses (FIG. 2B), and the covariance value of 1.6 for negative polarity last write pulses (FIG. 2C), are less than the covariance value of 1.7 for random polarity last write pulses (FIG. 2A). There is a 41% decrease in the covariance when the last write pulse polarity is always positive. There is similar improvement at track positions other than 1500.

HARDWARE COMPONENTS AND INTERCONNECTIONS

Drive Electronics

Figure 3:
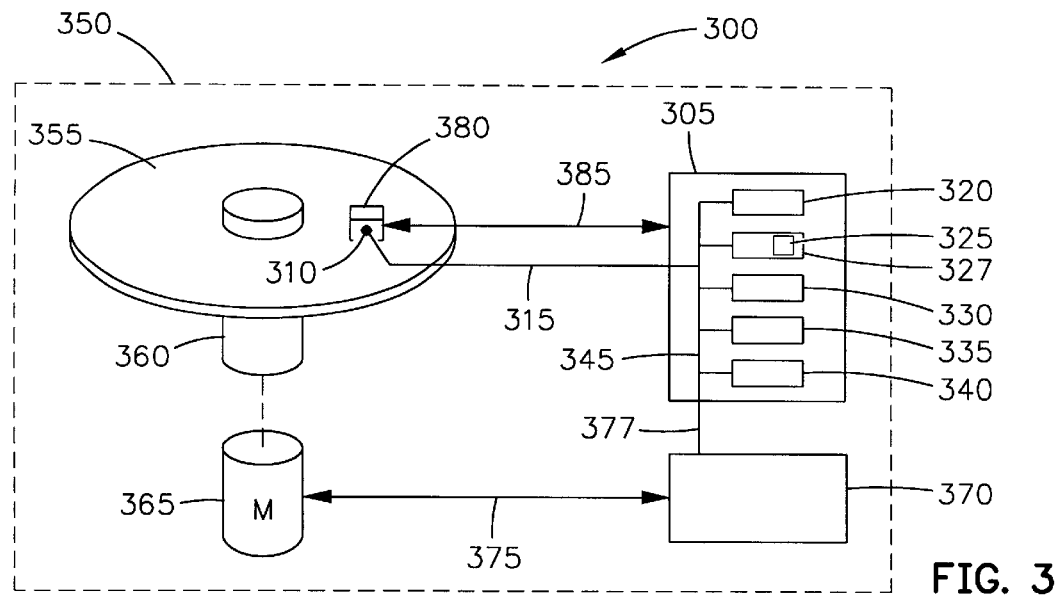
FIG. 3 is a block diagram of a disk drive, including drive electronics, according to an illustrative embodiment of the invention.

FIG. 3 illustrates a combined read-write head disk drive 300, including an illustrative embodiment of the drive electronics 305 of the invention, which may also be referred to as arm electronics. The drive electronics are connected to the combined readwrite head 310 with signal lines 315. The combined read-write head includes a read head employing a magnetoresistive (NM) sensor, and a write head, and is preferably a merged head.

The drive electronics include a write driver 320 for generating a set of write pulses. The drive electronics also include a polarity detector 325. The polarity detector provides a polarity signal that indicates the polarity of the last write pulse of a set of write pulses. Preferably, the polarity detector is part of a channel chip 327, which is part of the drive electronics. The channel chip encodes data to be stored, as changes in current in the write head. The channel chip communicates the required changes in current to the write driver. The polarity detector is a register or other logic element of the channel chip that indicates the polarity that the channel chip instructed the write driver to use for the last write pulse.

Alternatively, the polarity detector may be implemented in other embodiments. In one alternative embodiment, the polarity detector counts the number of pulses, and based on knowledge of the polarity of the first pulse and the number of polarity changes associated with each pulse, determines the polarity of the last write pulse. In another alternative embodiment, the polarity detector detects the polarity by ascertaining the direction of the current supplied to the write head for the last write pulse. In all of the embodiments of the polarity detector, the polarity detector provides a polarity signal that indicates the polarity of the last write pulse.

The drive electronics also include a write head polarity controller 330, which optionally can be part of the channel chip 327. In a preferred embodiment, the write head polarity controller is responsive to the polarity signal, and pulses the write head with one or more additional pulses of a designated polarity if the polarity signal indicates that the last write pulse of the set of pulses does not have the designated polarity. Preferably, the write head is pulsed with just one additional pulse. The write polarity controller pulses the write head with the one or more additional pulses by outputting a signal that causes the write driver to supply the requisite current to the write head. More specifically, the write head polarity controller outputs a pulse activation signal if the last write pulse does not have the designated polarity, and the pulse activation signal causes the write driver to pulse the write head with one or more additional pulses of the designated polarity. In an alternative embodiment, the write head polarity controller pulses the write head with one or more additional pulses of the designated polarity regardless of the polarity of the last write pulse. The designated polarity, also referred to as the desired polarity, of the additional pulses is preferably programmable into the write head polarity controller of the drive electronics.

The drive electronics preferably also include a preamplifier 335 for amplifying signals from the MR sensor of the read head of the combined read-write head.

The drive electronics preferably also include a digital processing device 340 that controls the write driver, the channel chip, the polarity detector, and the write head polarity controller. The digital processing device 340 can be any type of digital processing device, for example a microcontroller, a microprocessor, or a digital signal processor. The digital processing device can even comprise a combination of devices. The digital processing device 340 is preferably a microcontroller. The digital processing device executes a sequence of machine readable instructions to implement one or more of the methods of the present invention. In an alternative embodiment, rather than being a part of the drive electronics, the digital processing device could be separate from, but in communication with, the drive electronics. Data bus 345 provides for communication between the digital processing device, the write driver, channel chip, polarity detector, write head polarity controller, and the preamplifier.

Application Specific Integrated Circuit

Figure 4:
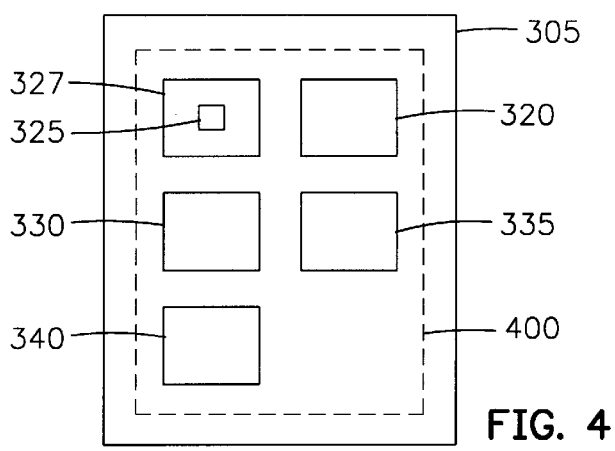
FIG. 4 is a plan view of an application specific integrated circuit (ASIC) with at least one circuit that includes drive electronics for a combined read-write head disk drive.

FIG. 4 illustrates a preferred embodiment of the invention in which drive electronics 305, including the polarity detector 325 and write head polarity controller 330, and preferably also including the channel chip 327, the write driver 320, the preamplifier 335, and the digital processing device 340 are implemented in an application specific integrated circuit (ASIC) 400, on a monolithic substrate of silicon material. Optionally, the ASIC may also include additional circuits.

Known integrated circuit manufacturing techniques provide for the fabrication of ASIC's. For example, the ASIC can be built using a 0.35 micron CMOS fabrication process available from the International Business Machines Corporation, Armonk, N.Y.

In an alternative embodiment, the drive electronics could be assembled with a number of digital and analog IC chips and/or discrete components.

Combined Read-Write Head Disk Drive

FIG. 3 illustrates a preferred embodiment of the disk drive 300 of the invention. The components of the disk drive are mounted in a housing 350. The disk drive includes the polarity detector 325 and the write head polarity controller 330, and preferably also includes the channel chip 327, the write driver 320, the preamplifier 335, and the digital processing device 340 discussed above. The disk drive also includes a rotatable magnetic disk 355 on a spindle 360, and a motor 365 for rotating the magnetic disk. The motor is controlled by drive controls 370. Signal line 375 enables electronic communication between the drive controls and the motor, and signal line 377 enables electronic communication between the drive electronics and the drive controls.

The disk drive also includes a combined read-write head 310, which is preferably a thin film merged head. Combined read-write heads, which include both a write head and a read head, are widely known in the art. The read head in a combined read-write head is typically implemented with a magnetoresistive (MR) sensor. Data and other signals are communicated between the drive electronics and the combined read-write head over the signal lines 315.

The disk drive also includes a slider 380, and a support 385 that may also be referred to as a suspension. The combined read-write head is mounted on the slider which in turn is connected to the support. The support is mounted in the housing 350 for supporting the combined read-write head in a transducing relationship with one of the information-carrying circular tracks (not shown) on the magnetic disk 355, in response to rotation of the magnetic disk.

When the disk is rotated, the slider rides on a cushion of air, referred to as an air bearing, which is generated by the movement of the disk. The bottom surfaces of the slider and the combined read-write head are in a plane, called an air bearing surface (ABS), that faces a surface of the disk. Movements of the combined read-write head with respect to the magnetic disk are controlled by signals from the drive electronics.

Preferably the disk drive includes a plurality of combination read-write heads, each mounted on a respective slider. Alternatively, more than one combination readwrite head may be mounted on a single slider.

Magnetic Media Drive

Figure 5:
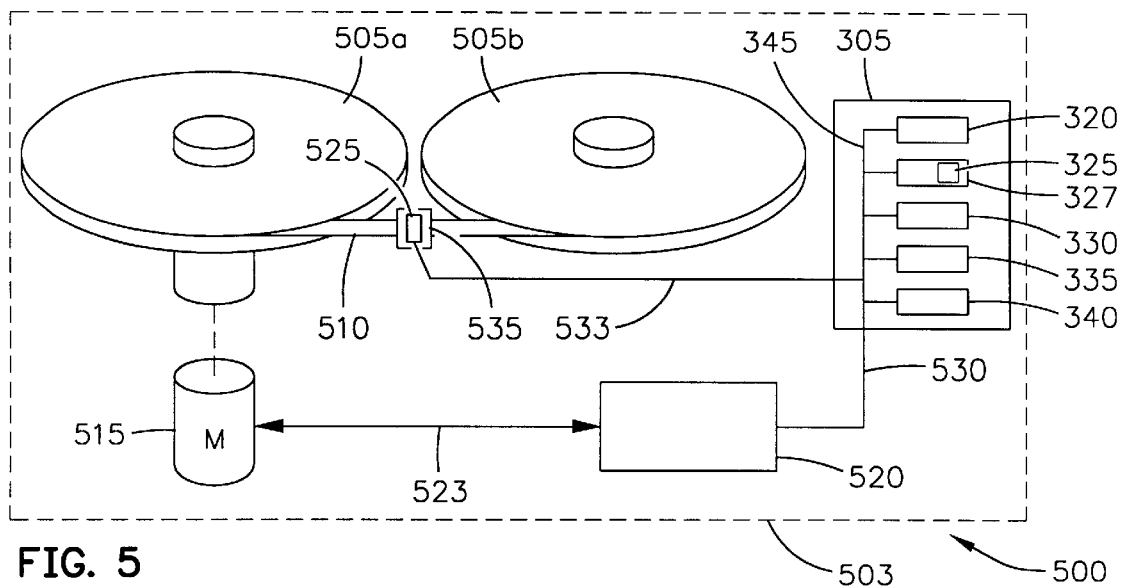
FIG. 5 is a block diagram of a magnetic media drive according to an illustrative embodiment of the invention.

FIG. 5 is an illustrative embodiment of a magnetic media drive 500 illustrating an alternative embodiment of the invention. The components of the magnetic media drive are mounted in a housing 503. The magnetic media drive includes the polarity detector 325 and the write head polarity controller 330, and preferably also includes the channel chip 327, the write driver 320, the preamplifier 335, and the digital processing device 340 discussed above. Data bus 345 provides for communication between the digital processing device, the write driver, polarity detector, channel chip, write head polarity controller, and the preamplifier.

The magnetic media drive also includes a pair of rotatable reels 505a, 505b, that house magnetic tape 510. A motor 515 rotates the reels. The motor is controlled by motor controls 520. Optionally, another motor (not shown) can be connected to the second reel 505b. Optionally, a capstan (not shown) and capstan motor (not shown) may also be included. Signal line 523 enables electronic communication between the motor controls and the motor, and signal line 530 enables electronic communication between the drive electronics and the motor controls.

The magnetic media drive also includes a combined read-write head 525, which is preferably a thin film merged head. Signals and data are communicated between the drive electronics and the combined read-write head over the signal line 533.

The combined read-write head is mounted on a head mount 535, that supports the combined read-write head in a transducing relationship with one of a plurality of information-carrying tracks (not shown) on the magnetic tape, in response to movement of the magnetic tape between the reels. Preferably, there are a plurality of combined read-write heads in a transducing relationship with the information-carrying tracks on the magnetic tape. Movement of the tape across the combined read-write head or heads is controlled by signals from the motor electronics.

OPERATION

In addition to the hardware embodiments described above, a different aspect of the invention concerns a method for writing a block of data with a combined read-write head, and a method for recovery from a read error. For clarity of explanation, but with no limitation intended thereby, the tasks of the methods are illustrated in the context of the hardware components of FIG. 3.

First Method for Writing a Block of Data

Figure 6:
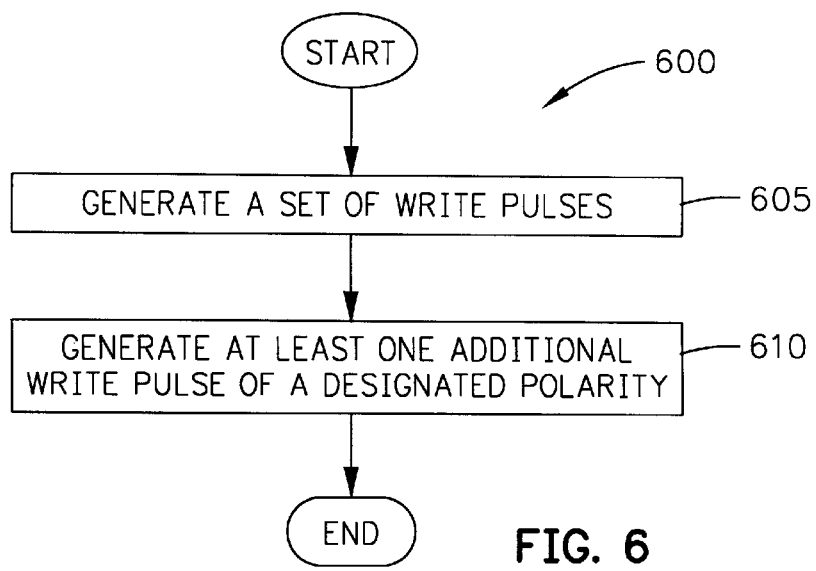
FIG. 6 is a flow chart for a method for writing a block of data with a combined read-write head according to an illustrative embodiment of the invention.

A first method for writing a block of data with a combined read-write head is illustrated by the tasks 600 of the flowchart in FIG. 6. In task 605 of FIG. 6, a set of write pulses is generated by the write driver of the drive electronics. In task 610, the write head polarity controller causes the write driver to generate at least one additional write pulse of a previously determined designated polarity. Preferably, a single additional pulse is generated. Preferably, the additional pulse has an amplitude and duration similar to the pulses used to write data on the disk 355. However a smaller amplitude and/or a smaller duration could also be used. In this embodiment, the additional pulse or pulses are generated regardless of the polarity of the preceding pulse, thereby ensuring the desired polarity of the last write pulse without having to evaluate the polarity of any of the pulses. The additional write pulse or pulses may also be referred to as a restore pulse or pulses. The block of data includes the set of write pulses and the additional write pulse.

Second Method for Writing a Block of Data

Figure 7:
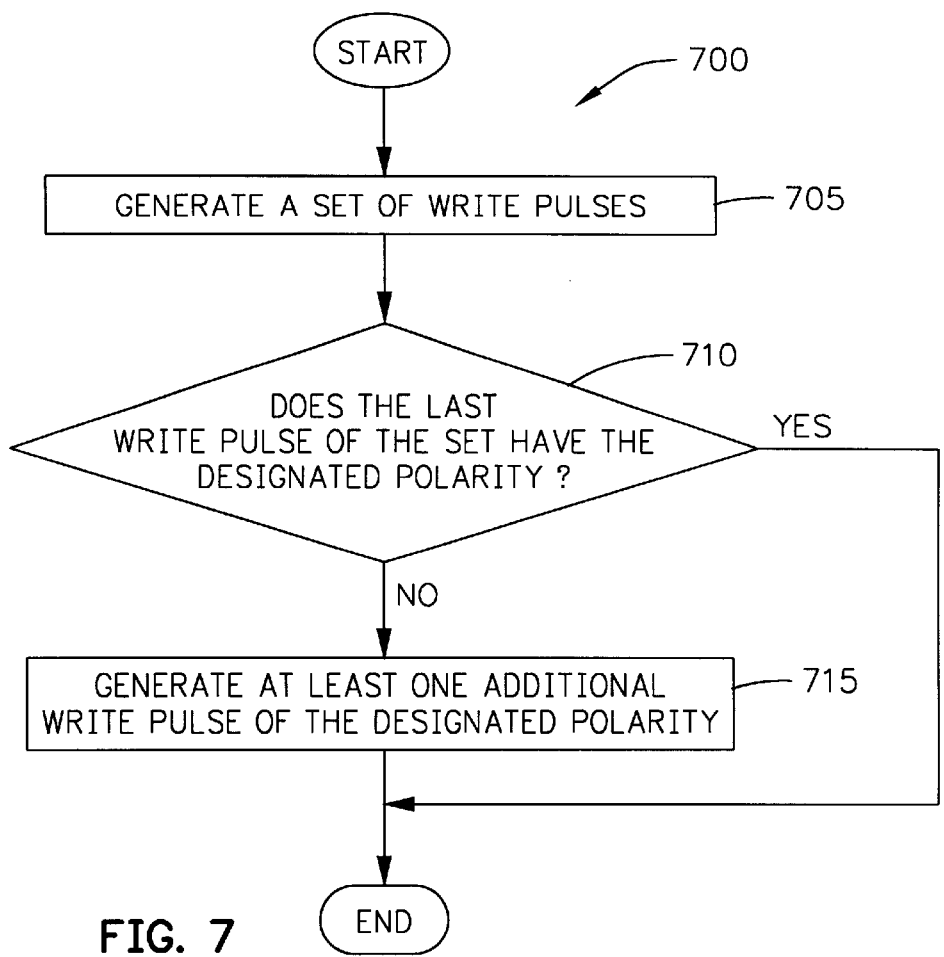
FIG. 7 is a flow chart for a method for writing a block of data with a combined read-write head according to another illustrative embodiment of the invention.

A second, preferred method for writing a block of data with a combined readwrite head is illustrated by the tasks 700 of the flowchart in FIG. 7. In task 705, a set of write pulses is generated by the write driver of the drive electronics. Next, in task 710, the polarity detector determines whether the last write pulse of the set has a previously determined designated polarity. Next, in task 715, if the last write pulse of the set does not have the designated polarity, the write head polarity controller causes the write driver to generate at least one additional write pulse of the designated polarity, which may also be referred to as a restore pulse. Preferably a single additional pulse is generated. Preferably, the additional pulse has an amplitude and duration similar to the pulses used to write data on the disk 355. However a smaller amplitude and/or a smaller duration could also be used. The additional pulse or pulses may be referred to as a restore pulse or pulses. The block of data includes the set of write pulses and the additional write pulse or pulses.

Determining the Designated Polarity

Figure 8A:
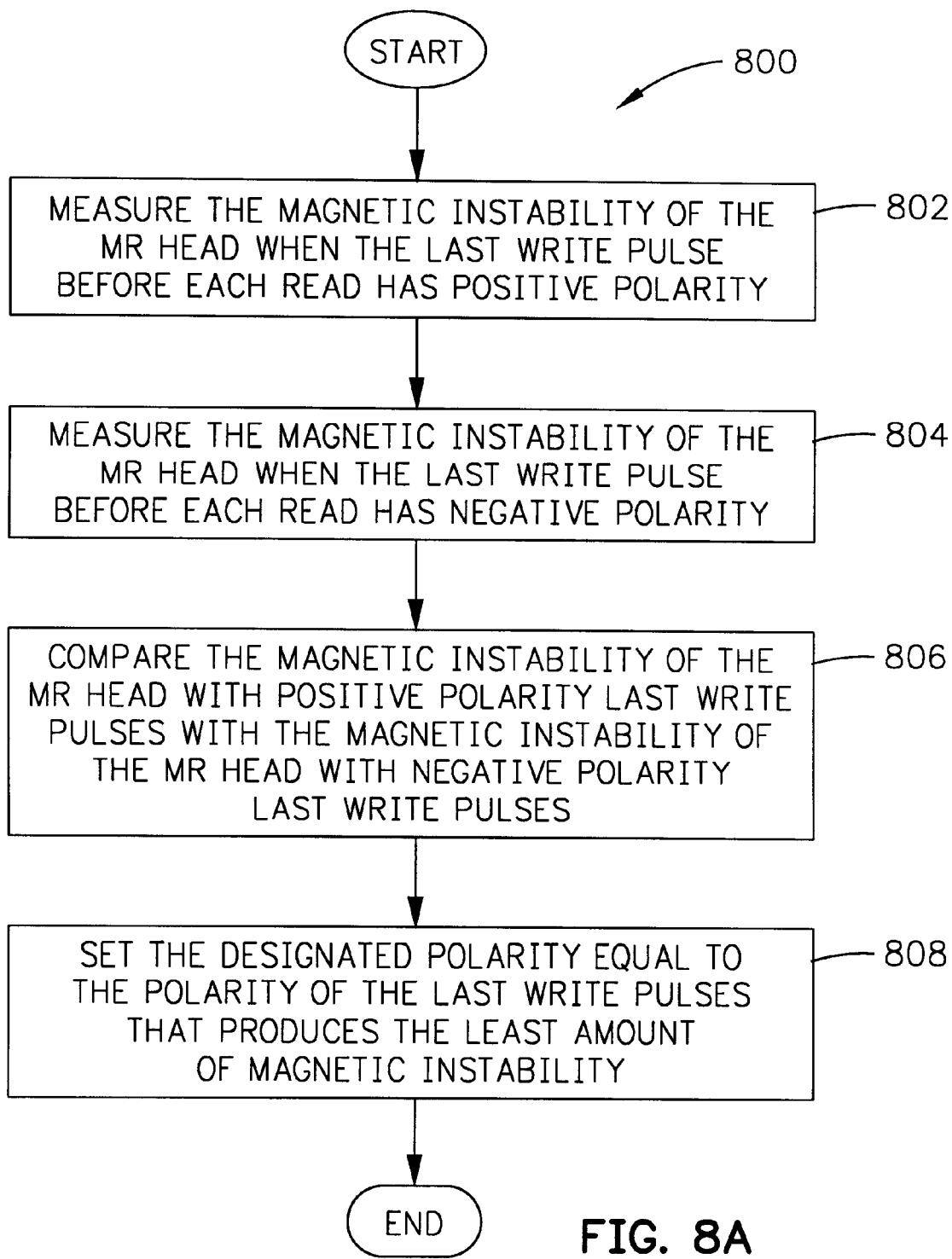
FIG. 8A is a flow chart for a method for determining the designated polarity for a combined read-write head.

Preferably, both the first and second methods for writing a block of data described above are preceded by the tasks 800 of the flowchart of FIG. 8A. The tasks 800 are accomplished in order to determine the designated polarity of the last write pulse. In task 802 the magnetic instability of the MR head is measured when the last write pulse before each read has positive polarity. Similarly, in task 804, the magnetic instability of the MR head is measured when the last write pulse before each read has negative polarity. In task 806, the magnetic instability of the MR head with positive polarity last write pulses is compared with the magnetic instability of the MR head with negative polarity last write pulses. Finally, in task 808, the designated polarity is set equal to the polarity of the last write pulses that produces the least amount of magnetic instability.

Figure 8B:
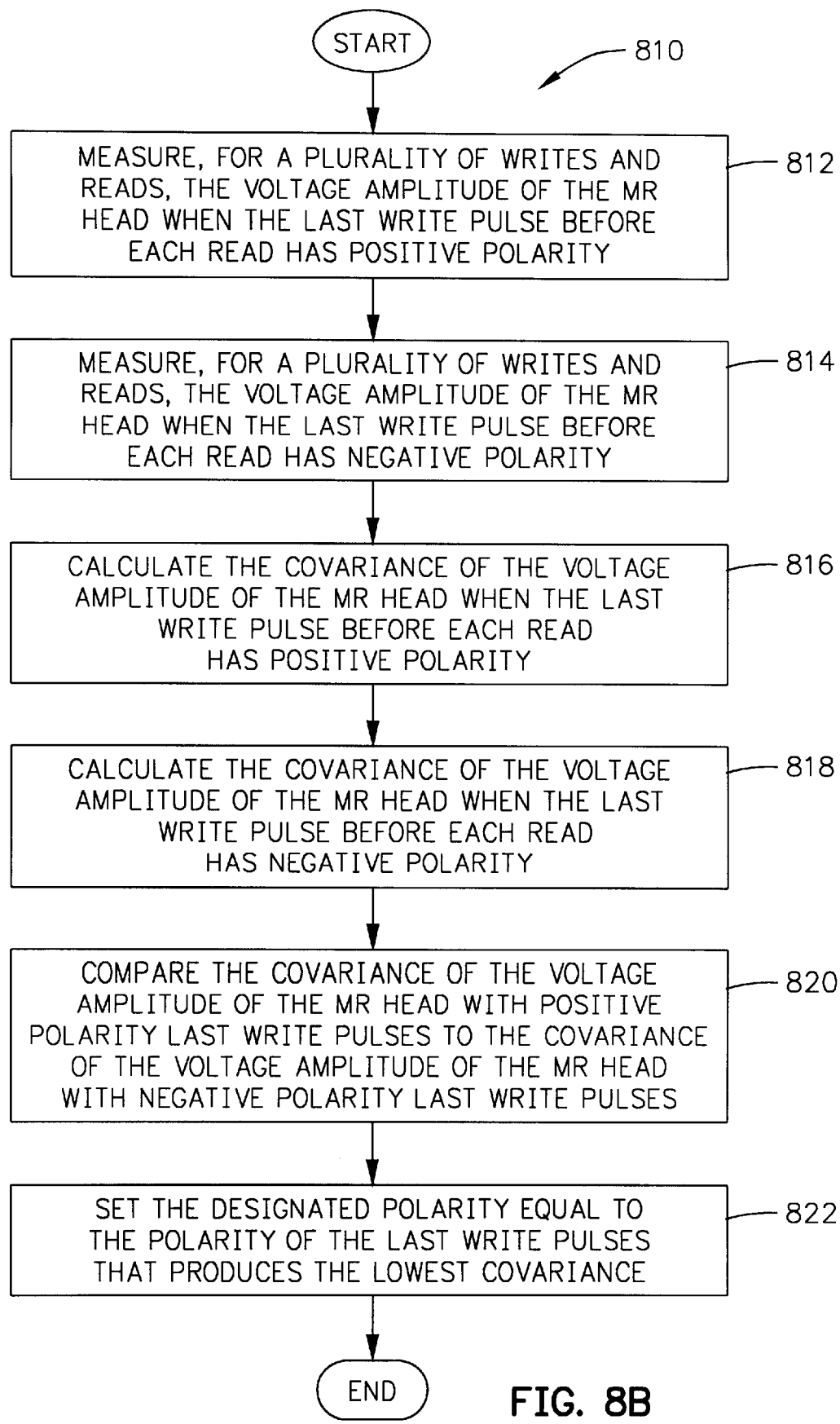
FIG. 8B is a flow chart for a preferred method for determining the designated polarity for a combined read-write head.

FIG. 8B illustrates the preferred method for measuring the magnetic instability in order to determine the designated polarity. Preferably, both the first and second methods for writing a block of data described above are preceded by the tasks 810 of the flowchart of FIG. 8B. In task 812 the voltage amplitude of the MR head is measured for a plurality of writes and reads, with the last write pulse before each read having positive polarity. Similarly, in task 814 the voltage amplitude of the MR head is measured for a plurality of writes and reads, with the last write pulse before each read having negative polarity. Preferably, the peak to peak voltage is measured. Alternatively, RMS or other measures of the voltage across the MR sensor of the MR head could be used. In task 816 the covariance of the voltage amplitude of the MR head is calculated for the case when the last write pulse before each read has positive polarity. Similarly, in task 818 the covariance of the voltage amplitude of the MR head is calculated for the case when the last write pulse before each read has negative polarity. In task 820 the covariance of the voltage amplitude of the MR head with positive polarity last write pulses is compared to the covariance of the voltage amplitude of the MR head with negative polarity last write pulses. Finally, in task 822, the designated polarity is set equal to the polarity of the last write pulses that produces the lowest covariance.

Figure 8C:
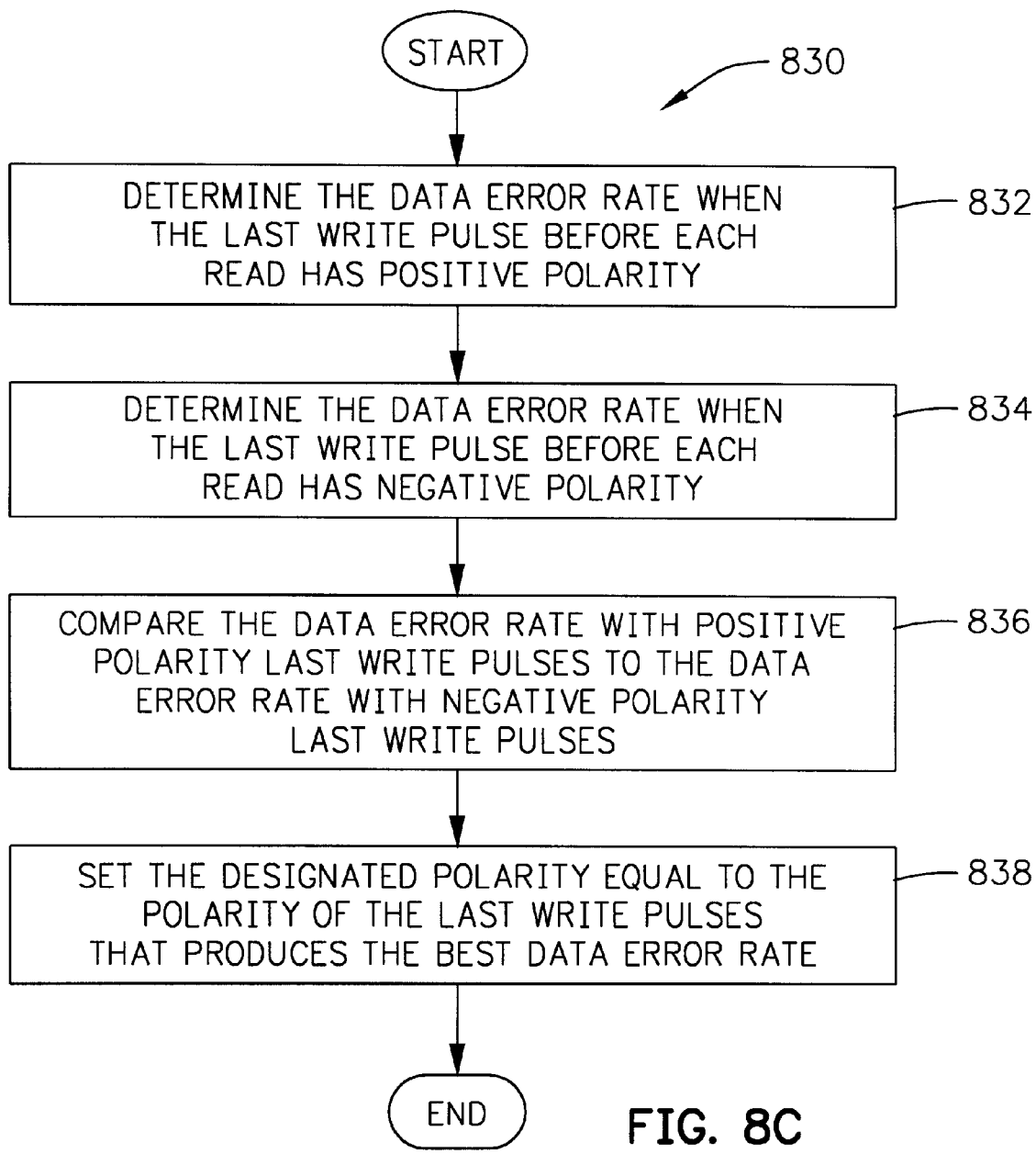
FIG. 8C is a flow chart for an alternative method for determining the designated polarity for a combined read-write head.

FIG. 8C illustrates the tasks 830 of an alternative method for measuring the magnetic instability in order to determine the designated polarity. In task 832, the data error rate is determined when the last write pulse before each read has positive polarity. Similarly, in task 834, the data error rate is determined when the last write pulse before each read has negative polarity. In task 836, the data error rate with positive polarity last write pulses is compared with the data error rate with negative polarity last write pulses. Finally, in task 838, the designated polarity is set equal to the polarity of the last write pulses that produces the best data error rate.

Figure 8D:
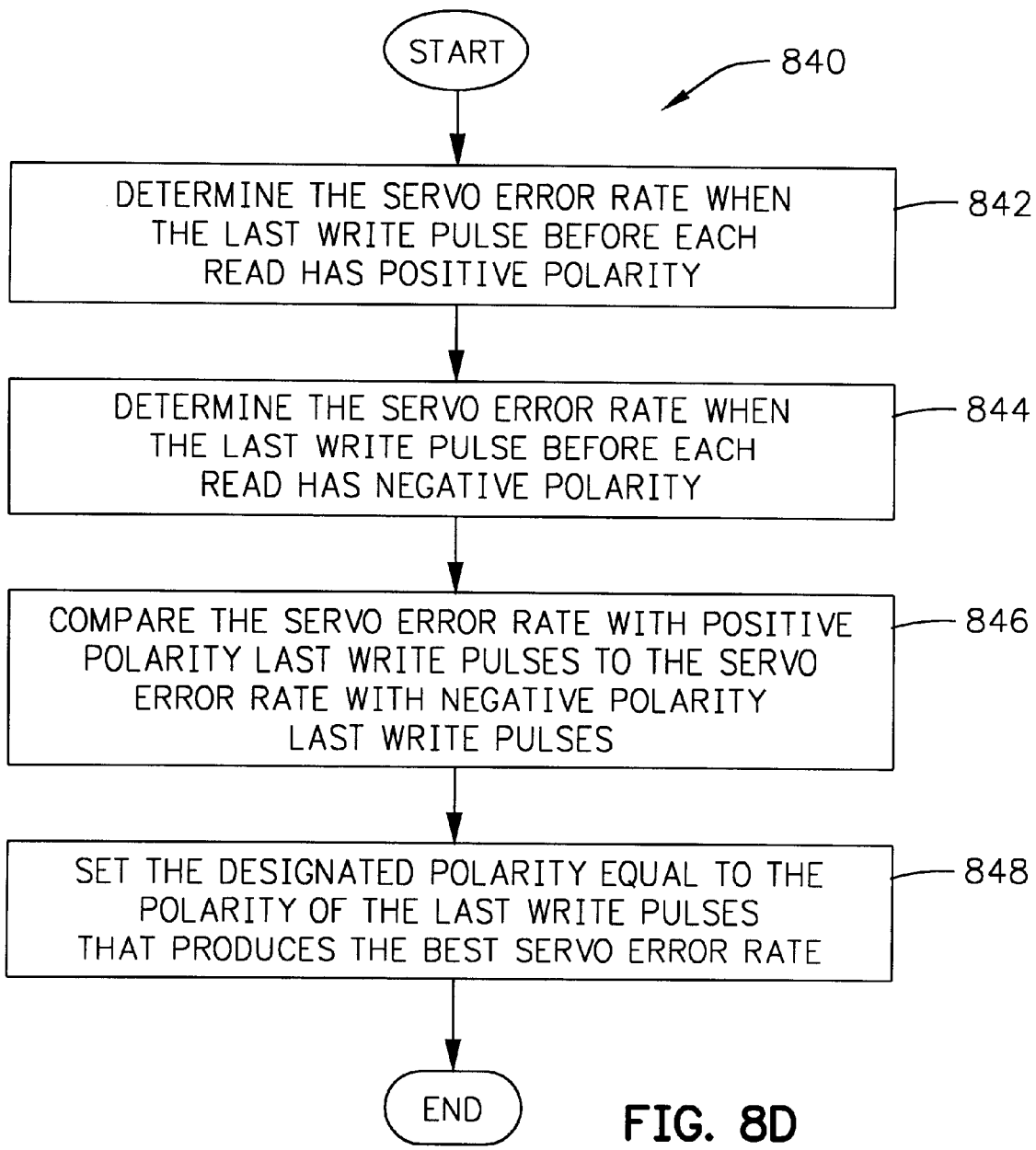
FIG. 8D is a flow chart for another alternative method for determining the designated polarity for a combined read-write head.

FIG. 8D illustrates the tasks 840 of another alternative method for measuring the magnetic instability in order to determine the designated polarity. In task 842, the servo error rate is determined when the last write pulse before each read has positive polarity. Similarly, in task 844, the servo error rate is determined when the last write pulse before each read has negative polarity. In task 846, the servo error rate with positive polarity last write pulses is compared with the servo error rate with negative polarity last write pulses. Finally, in task 848, the designated polarity is set equal to the polarity of the last write pulses that produces the best servo error rate.

Figure 8E:
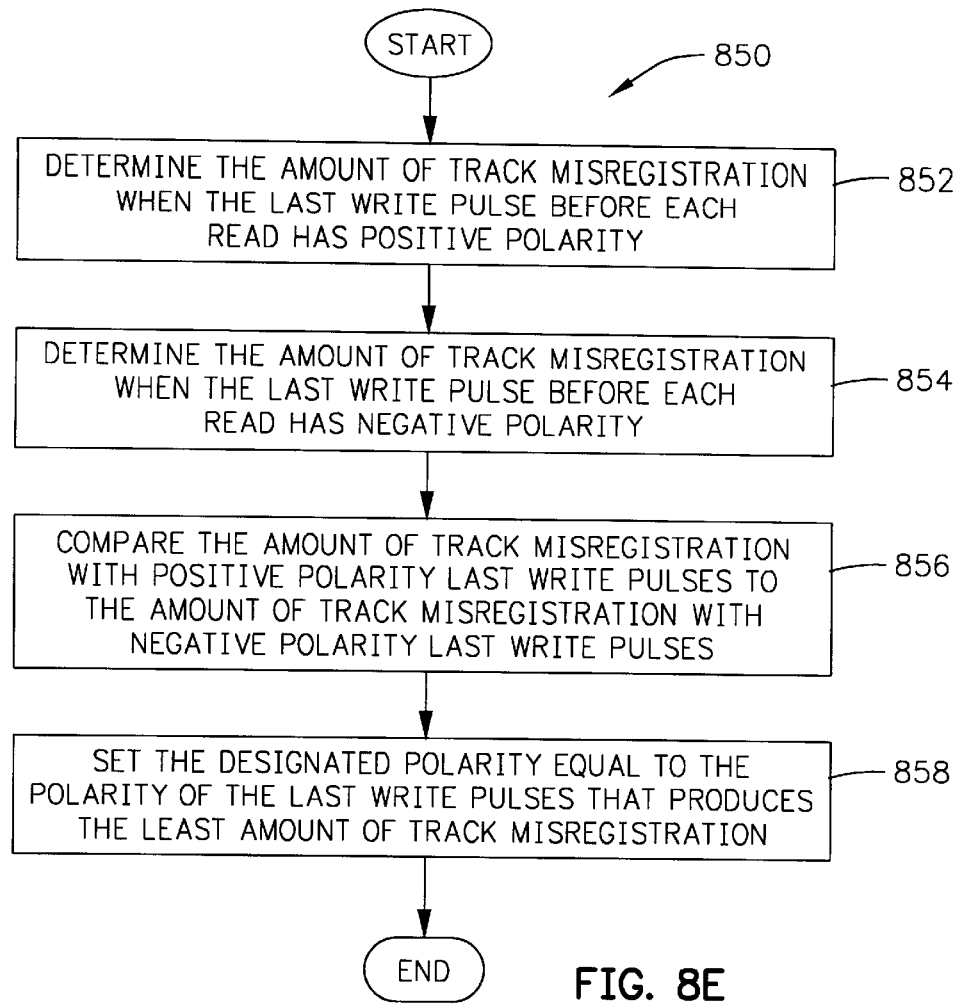
FIG. 8E is a flow chart for another alternative method for determining the designated polarity for a combined read-write head.

FIG. 8E illustrates the tasks 850 of another alternative method for measuring the magnetic instability in order to determine the designated polarity. In task 852, the amount of track misregistration when the last write pulse before each read has positive polarity is determined. Similarly, in task 854, amount of track misregistration when the last write pulse before each read has negative polarity is determined. In task 856, the amount of track misregistration with positive polarity last write pulses is compared with the amount of track misregistration with negative polarity last write pulses. Finally, in task 858, the designated polarity is set equal to the polarity of the last write pulses that produces the least amount of track misregistration.

Method for Recovery from a Read Error

Figure 9:
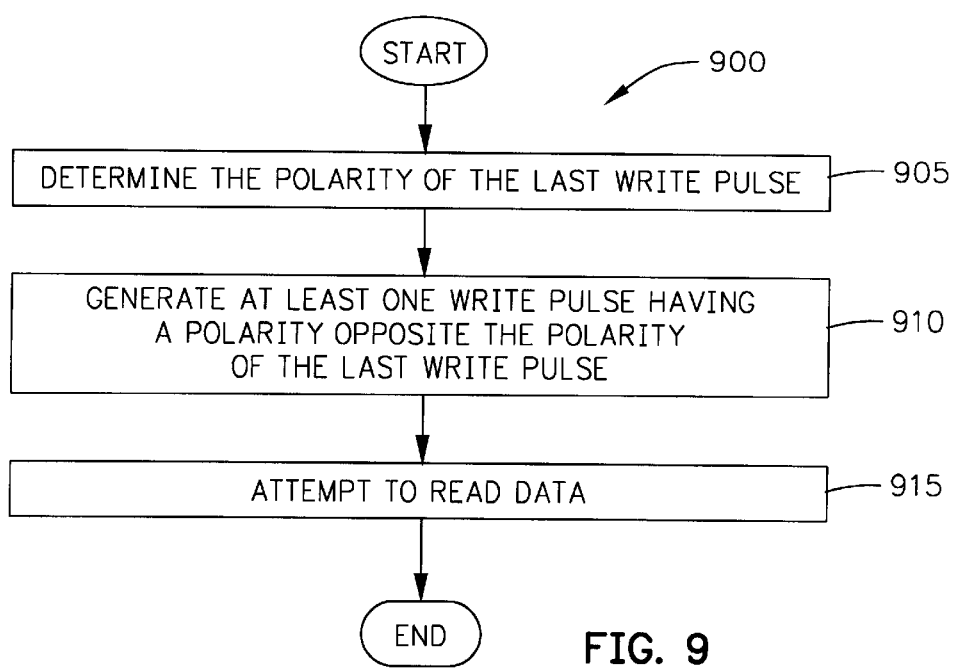
FIG. 9 is a flow chart for a method for recovery from a read error with a combined read-write head according to another illustrative embodiment of the invention.

A method for recovery from a read error with a combined read-write head according to another illustrative embodiment of the invention is illustrated by the tasks 900 of the flowchart in FIG. 9. In task 905, the polarity of the last write pulse is determined with the polarity detector. Next, in task 910 at least one write pulse having a polarity opposite the polarity of the last write pulse is generated by the write head polarity controller. In task 915, the combined read-write head attempts to read data. Generating the additional write pulse will improve read performance if the polarity of the additional write pulse results in lower read head magnetic instability than the polarity of the last write pulse.

ARTICLE OF MANUFACTURE

As discussed above, the drive electronics 305 preferably includes a digital processing device 340 that executes a sequence of machine readable instructions to implement one or more of the methods of the present invention. One or more of the methods of the present invention may include determining the designated polarity. Alternatively, the designated polarity is programmable, in which case the designated polarity can be designated in the machine readable instructions. In this alternative embodiment, the designated polarity is programmed into the drive electronics by being designated in machine readable instructions, that can reside in memory of the drive electronics. Alternatively, the designated polarity can be programmed into the drive electronics in hardware, for example in an ASIC.

In an illustrative embodiment of the invention, the machine readable instructions may comprise lines of "C" and/or assembly language code that implement the tasks of one or more of the methods discussed herein. These instructions may reside in various types of data storage media. In this respect the present invention concerns an article of manufacture, comprising a data storage medium tangibly embodying a program of machine readable instructions executable by a digital data processor (or digital processing device) to perform one or more of the methods for writing a block of data with a combined read-write head, and/or a method for recovery from a read error, as discussed herein.

Figure 10:
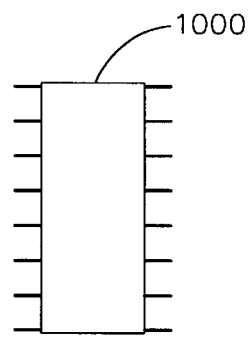
FIG. 10 is an article of manufacture embodied by a data storage medium in accordance with the invention.

Preferably, the data storage medium is a read only memory (ROM) integrated circuit 1000, illustrated in FIG. 10. Alternatively, instead of, or in addition to the ROM, the data storage medium may be a magnetic data storage diskette, a "hard drive" (for example the disk drive 300), a RAID array, random access memory (RAM), electronically erasable RAM, an optical storage device (for example, a WORM), magnetic tape, paper "punch" cards, and/or other data storage media, or any combination of these media. Preferably, for execution of the sequence of machine readable instructions, the instructions are loaded into RAM in the channel chip.

CONCLUSION

While there have been shown what are presently considered to be preferred embodiments of the invention, it will be apparent to those skilled in the art that various changes and modifications can be made herein without departing from the scope of the invention as defined by the appended claims.

What is claimed is:

1. Drive electronics for a combined read-write head disk drive, comprising:

a polarity detector that provides a polarity signal indicating the polarity of a last write pulse of a set of write pulses; and a write head polarity controller responsive to the polarity signal, the write head polarity controller being configured to output a pulse activation signal if the last write pulse of the set of write pulses does not have a designated polarity, the pulse activation signal causing the write head to be pulsed with one or more additional pulses of said designated polarity.

2. The drive electronics of claim 1 wherein the designated polarity is programmed into the drive electronics.

3. The drive electronics of claim 1 further comprising a write driver.

4. The drive electronics of claim 3 further comprising a digital processing device.

5. A magnetic media drive, comprising:

a housing;

magnetic media mounted in the housing;

means for moving the magnetic media;

a combined read-write head;

means mounted in the housing for supporting the combined read-write head in a transducing relationship with respect to the magnetic media in response to movement of the magnetic media;

a polarity detector that provides a polarity signal indicating the polarity of a last write pulse of a set of write pulses; and a write head polarity controller responsive to the polarity signal, the write head polarity controller being configured to output a pulse activation signal if the last write pulse of the set of write pulses does not have a designated polarity, the pulse activation signal causing the write head to be pulsed with one or more additional pulses of said designated polarity.

6. A disk drive, comprising:

a housing;

a rotatable magnetic disk mounted in the housing;

means for rotating the magnetic disk;

a combined read-write head;

a support, including a slider, mounted in the housing for supporting the combined read-write head in a transducing relationship with respect to the magnetic disk in response to rotation of the magnetic disk;

a polarity detector that provides a polarity signal indicating the polarity of a last write pulse of a set of write pulses; and a write head polarity controller responsive to the polarity signal, the write head polarity controller being configured to output a pulse activation signal if the last write pulse of the set of write pulses does not have a designated polarity, the pulse activation signal causing the write head to be pulsed with one or more additional pulses of said designated polarity.

7. The disk drive of claim 6 wherein the combined read-write head is a merged head.

8. The disk drive of claim 6 wherein the combined read-write head is a piggyback head.

9. A monolithic application specific integrated circuit (ASIC), comprising:

one or more circuits, at least one of the circuits comprising drive electronics for a combined read-write head disk drive, including:

a polarity detector that provides a polarity signal indicating the polarity of a last write pulse of a set of write pulses; and a write head polarity controller responsive to the polarity signal, the write head polarity controller being configured to output a pulse activation signal if the last write pulse of the set or write pulses does not have a designated polarity, the pulse activation signal causing the write head to be pulsed with one or more additional pulses of said designated polarity.

* * * * *